US010736112B2

(12) United States Patent
Liu et al.

(10) Patent No.: US 10,736,112 B2
(45) Date of Patent: Aug. 4, 2020

(54) COMMON SEARCH SPACE SCRAMBLING FOR MULTEFIRE COVERAGE ENHANCEMENT

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/160,775

(22) Filed: Oct. 15, 2018

(65) Prior Publication Data

US 2019/0124663 A1 Apr. 25, 2019

Related U.S. Application Data

(60) Provisional application No. 62/574,730, filed on Oct. 19, 2017.

(51) Int. Cl.
*H04W 72/04* (2009.01)
*H04L 5/00* (2006.01)
(Continued)

(52) U.S. Cl.
CPC ....... *H04W 72/0466* (2013.01); *H04L 5/0048* (2013.01); *H04L 5/0053* (2013.01);
(Continued)

(58) Field of Classification Search
CPC . H04W 72/0446; H04W 76/10; H04W 48/12; H04W 72/0406; H04W 88/02;
(Continued)

(56) References Cited

U.S. PATENT DOCUMENTS

2011/0077038 A1* 3/2011 Montojo ............... H04B 7/024
455/507
2013/0250874 A1 9/2013 Luo et al.
(Continued)

FOREIGN PATENT DOCUMENTS

EP 2738966 A2 6/2014

OTHER PUBLICATIONS

International Search Report and Written Opinion—PCT/US2018/056123—ISA/EPO—dated Dec. 19, 2018.
(Continued)

*Primary Examiner* — Duc C Ho
(74) *Attorney, Agent, or Firm* — Liem T. Do

(57) ABSTRACT

Methods, systems, and devices for wireless communications are described. In some wireless networks (e.g., MulteFire networks), a base station may transmit control information to a user equipment (UE) to enable the UE to access the network and establish a connection with the network. The base station may transmit the control information to the UE in search spaces of an enhanced physical downlink control channel (ePDCCH). In some cases, resources used to transmit control information in a first common search space of the ePDCCH may overlap with resources used to transmit control information in a second common search space of the ePDCCH. In such cases, using the techniques described herein, a base station may encode control information transmitted in the different types of search spaces using different scrambling sequences. As such, a UE may be able to differentiate between the control information transmitted in the different types of common search spaces.

30 Claims, 12 Drawing Sheets

(51) Int. Cl.
*H04W 48/12* (2009.01)
*H04W 76/10* (2018.01)
*H04W 88/08* (2009.01)
*H04L 27/26* (2006.01)
*H04W 88/02* (2009.01)
*H04L 25/03* (2006.01)

(52) U.S. Cl.
CPC ....... *H04W 48/12* (2013.01); *H04W 72/0446* (2013.01); *H04W 76/10* (2018.02); *H04L 5/001* (2013.01); *H04L 5/0007* (2013.01); *H04L 25/03866* (2013.01); *H04L 27/2602* (2013.01); *H04L 27/2626* (2013.01); *H04L 27/2647* (2013.01); *H04W 72/0406* (2013.01); *H04W 88/02* (2013.01); *H04W 88/08* (2013.01)

(58) Field of Classification Search
CPC .... H04W 88/08; H04L 5/0048; H04L 5/0053; H04L 5/007; H04L 5/001; H04L 25/03866; H04L 27/2602; H04L 27/2626; H04L 27/2647
See application file for complete search history.

(56) References Cited

U.S. PATENT DOCUMENTS

| | | | |
|---|---|---|---|
| 2015/0263832 A1* | 9/2015 | Takeda | H04J 11/0053 370/329 |
| 2016/0043849 A1* | 2/2016 | Lee | H04W 72/042 370/329 |
| 2016/0119900 A1* | 4/2016 | You | H04W 72/042 370/336 |
| 2016/0164653 A1* | 6/2016 | Wang | H04L 5/0048 370/329 |
| 2017/0134880 A1* | 5/2017 | Rico Alvarino | H04L 5/0053 |
| 2017/0135096 A1* | 5/2017 | Kuchibhotla | H04W 72/0406 |
| 2017/0135116 A1 | 5/2017 | Kuchibhotla et al. | |
| 2019/0097756 A1* | 3/2019 | Chatterjee | H04L 5/0044 |

OTHER PUBLICATIONS

LG Electronics: "Discussion on DL Aspects in TOO NB-IoT", 3GPP Draft; R1-1806595, 3rd Generation Partnership Project (3GPP), Mobile Competence Centre; 650, Route Des Lucioles; F-06921 Sophia Antipolis, Cedex; France, vol. RAN WG1, No. Busan, Korea; May 21, 2018-May 25, 2018, May 20, 2018 (May 20, 2018), 19 Pages, XP051441797.

* cited by examiner

COMMON SEARCH SPACE SCRAMBLING FOR MULTEFIRE COVERAGE ENHANCEMENT

CROSS REFERENCES

The present Application for Patent claims the benefit of U.S. Provisional Patent Application No. 62/574,730 by LIU, et al., entitled "COMMON SEARCH SPACE SCRAMBLING FOR MULTEFIRE COVERAGE ENHANCEMENT," filed Oct. 19, 2017, assigned to the assignee hereof, and expressly incorporated herein.

BACKGROUND

The following relates generally to wireless communication and more specifically to common search space scrambling for MulteFire coverage enhancement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless networks (e.g., MulteFire networks), a base station may transmit control information to a UE to enable the UE to access the network and establish a connection with the network. In some cases, the base station may transmit the control information to the UE in an enhanced physical downlink control channel (ePDCCH). In such cases, however, the overhead associated with transmitting the control information in the ePDCCH to the UE may be high, which may result in reduced throughput in a wireless communications system.

SUMMARY

In some wireless networks (e.g., MulteFire networks), a base station may transmit control information to a UE to enable the UE to access the network and establish a connection with the network. The base station may transmit the control information to the UE in search spaces of an ePDCCH. In some cases, resources used to transmit control information in a first common search space of the ePDCCH may overlap with resources used to transmit control information in a second common search space of the ePDCCH, and it may be difficult for a UE to differentiate between the control information transmitted in the different types of common search spaces on the overlapping resources. As described herein, a base station may encode control information transmitted in the different types of common search spaces using different scrambling sequences. As such, a UE may determine the different scrambling sequences used to encode the control information in the different types of common search spaces, and the UE may be able to differentiate between the control information transmitted in the different types of common search spaces.

A method for wireless communication at a UE is described. The method may include identifying a first common search space of a first type and a second common search space of a second type to monitor for control information from a base station, where resources allocated for the first common search space overlap with resources allocated for the second common search space, determining a first scrambling sequence used to scramble control information in the first common search space and a second scrambling sequence used to scramble control information in the second common search space, and decoding the control information in the first common search space based at least in part on the first scrambling sequence or the control information in the second common search space based at least in part on the second scrambling sequence.

An apparatus for wireless communication at a UE is described. The apparatus may include means for identifying a first common search space of a first type and a second common search space of a second type to monitor for control information from a base station, where resources allocated for the first common search space overlap with resources allocated for the second common search space, means for determining a first scrambling sequence used to scramble control information in the first common search space and a second scrambling sequence used to scramble control information in the second common search space, and means for decoding the control information in the first common search space based at least in part on the first scrambling sequence or the control information in the second common search space based at least in part on the second scrambling sequence.

Another apparatus for wireless communication at a UE is described. The apparatus may include a processor, memory in electronic communication with the processor, and instructions stored in the memory. The instructions may be operable to cause the processor to identify a first common search space of a first type and a second common search space of a second type to monitor for control information from a base station, where resources allocated for the first common search space overlap with resources allocated for the second common search space, determine a first scrambling sequence used to scramble control information in the first common search space and a second scrambling sequence used to scramble control information in the second common search space, and decode the control information in the first common search space based at least in part on the first scrambling sequence or the control information in the second common search space based at least in part on the second scrambling sequence.

A non-transitory computer-readable medium for wireless communication at a UE is described. The non-transitory computer-readable medium may include instructions operable to cause a processor to identify a first common search space of a first type and a second common search space of a second type to monitor for control information from a base station, where resources allocated for the first common search space overlap with resources allocated for the second common search space, determine a first scrambling sequence used to scramble control information in the first common search space and a second scrambling sequence used to scramble control information in the second common search space, and decode the control information in the first common search space based at least in part on the first scrambling sequence or the control information in the second common search space based at least in part on the second scrambling sequence.

In some examples of the method, apparatus, and non-transitory computer-readable medium described above, determining the first scrambling sequence and the second scrambling sequence includes determining the first scrambling sequence and the second scrambling sequence based at least in part on a cell identifier of the base station. In some examples of the method, apparatus, and non-transitory computer-readable medium described above, the decoding includes blind decoding. Some examples of the method, apparatus, and non-transitory computer-readable medium described above may further include processes, features, means, or instructions for receiving, from the base station, a master information block (MIB) that identifies a resource allocation of the first common search space. Some examples of the method, apparatus, and non-transitory computer-readable medium described above may further include processes, features, means, or instructions for identifying a Multefire system information block (SIB) (SIB-MF1) grant in the control information in the first common search space.

Some examples of the method, apparatus, and non-transitory computer-readable medium described above may further include processes, features, means, or instructions for decoding a SIB-MF1 scheduled by the SIB-MF1 grant. Some examples of the method, apparatus, and non-transitory computer-readable medium described above may further include processes, features, means, or instructions for determining a resource allocation of the second common search space based at least in part on the decoded SIB-MF1. Some examples of the method, apparatus, and non-transitory computer-readable medium described above may further include processes, features, means, or instructions for identifying one or more grants for other SIBS, frame structure information, a random access message, a paging message, a transmit power control (TPC) message, or a combination thereof in the control information in the second common search space.

In some examples of the method, apparatus, and non-transitory computer-readable medium described above, the first common search space of the first type includes a type-0 common search space, and the second common search space of the second type includes a type-1 common search space. In some examples of the method, apparatus, and non-transitory computer-readable medium described above, the control information in the first common search space and the second common search space may be received in an ePDCCH. In some examples of the method, apparatus, and non-transitory computer-readable medium described above, the first scrambling sequence may be different from the second scrambling sequence.

A method for wireless communication at a base station is described. The method may include identifying control information to transmit in a first common search space of a first type and control information to transmit in a second common search space of a second type, where resources allocated for the first common search space overlap with resources allocated for the second common search space, encoding the control information to transmit in the first common search space using a first scrambling sequence and the control information to transmit in the second common search space using a second scrambling sequence, and transmitting the control information encoded using the first scrambling sequence in the first common search space and the control information encoded using the second scrambling sequence in the second common search space.

An apparatus for wireless communication at a base station is described. The apparatus may include means for identifying control information to transmit in a first common search space of a first type and control information to transmit in a second common search space of a second type, where resources allocated for the first common search space overlap with resources allocated for the second common search space, means for encoding the control information to transmit in the first common search space using a first scrambling sequence and the control information to transmit in the second common search space using a second scrambling sequence, and means for transmitting the control information encoded using the first scrambling sequence in the first common search space and the control information encoded using the second scrambling sequence in the second common search space.

Another apparatus for wireless communication at a base station is described. The apparatus may include a processor, memory in electronic communication with the processor, and instructions stored in the memory. The instructions may be operable to cause the processor to identify control information to transmit in a first common search space of a first type and control information to transmit in a second common search space of a second type, where resources allocated for the first common search space overlap with resources allocated for the second common search space, encode the control information to transmit in the first common search space using a first scrambling sequence and the control information to transmit in the second common search space using a second scrambling sequence, and transmit the control information encoded using the first scrambling sequence in the first common search space and the control information encoded using the second scrambling sequence in the second common search space.

A non-transitory computer-readable medium for wireless communication at a base station is described. The non-transitory computer-readable medium may include instructions operable to cause a processor to identify control information to transmit in a first common search space of a first type and control information to transmit in a second common search space of a second type, where resources allocated for the first common search space overlap with resources allocated for the second common search space, encode the control information to transmit in the first common search space using a first scrambling sequence and the control information to transmit in the second common search space using a second scrambling sequence, and transmit the control information encoded using the first scrambling sequence in the first common search space and the control information encoded using the second scrambling sequence in the second common search space.

Some examples of the method, apparatus, and non-transitory computer-readable medium described above may further include processes, features, means, or instructions for determining the first scrambling sequence and the second scrambling sequence based at least in part on a cell identifier of the base station. Some examples of the method, apparatus, and non-transitory computer-readable medium described above may further include processes, features, means, or instructions for transmitting a MIB that identifies a resource allocation of the first common search space.

Some examples of the method, apparatus, and non-transitory computer-readable medium described above may further include processes, features, means, or instructions for transmitting a SIB-MF1 grant in the control information in the first common search space. Some examples of the method, apparatus, and non-transitory computer-readable medium described above may further include processes, features, means, or instructions for transmitting an indication of a resource allocation of the second common search space in a SIB-MF1 scheduled by the SIB-MF1 grant. Some examples of the method, apparatus, and non-transitory computer-readable medium described above may further include processes, features, means, or instructions for transmitting one or more grants for other SIBs, frame structure information, a random access message, a paging message, a TPC message, or a combination thereof in the control information in the second common search space.

In some examples of the method, apparatus, and non-transitory computer-readable medium described above, the first common search space of the first type includes a type-0 common search space, and the second common search space of the second type includes a type-1 common search space. In some examples of the method, apparatus, and non-transitory computer-readable medium described above, the control information in the first common search space and the second common search space may be transmitted in an ePDCCH. In some examples of the of the method, apparatus, and non-transitory computer-readable medium described above the first scrambling sequence may be different from the second scrambling sequence.

DETAILED DESCRIPTION

Figure 1:
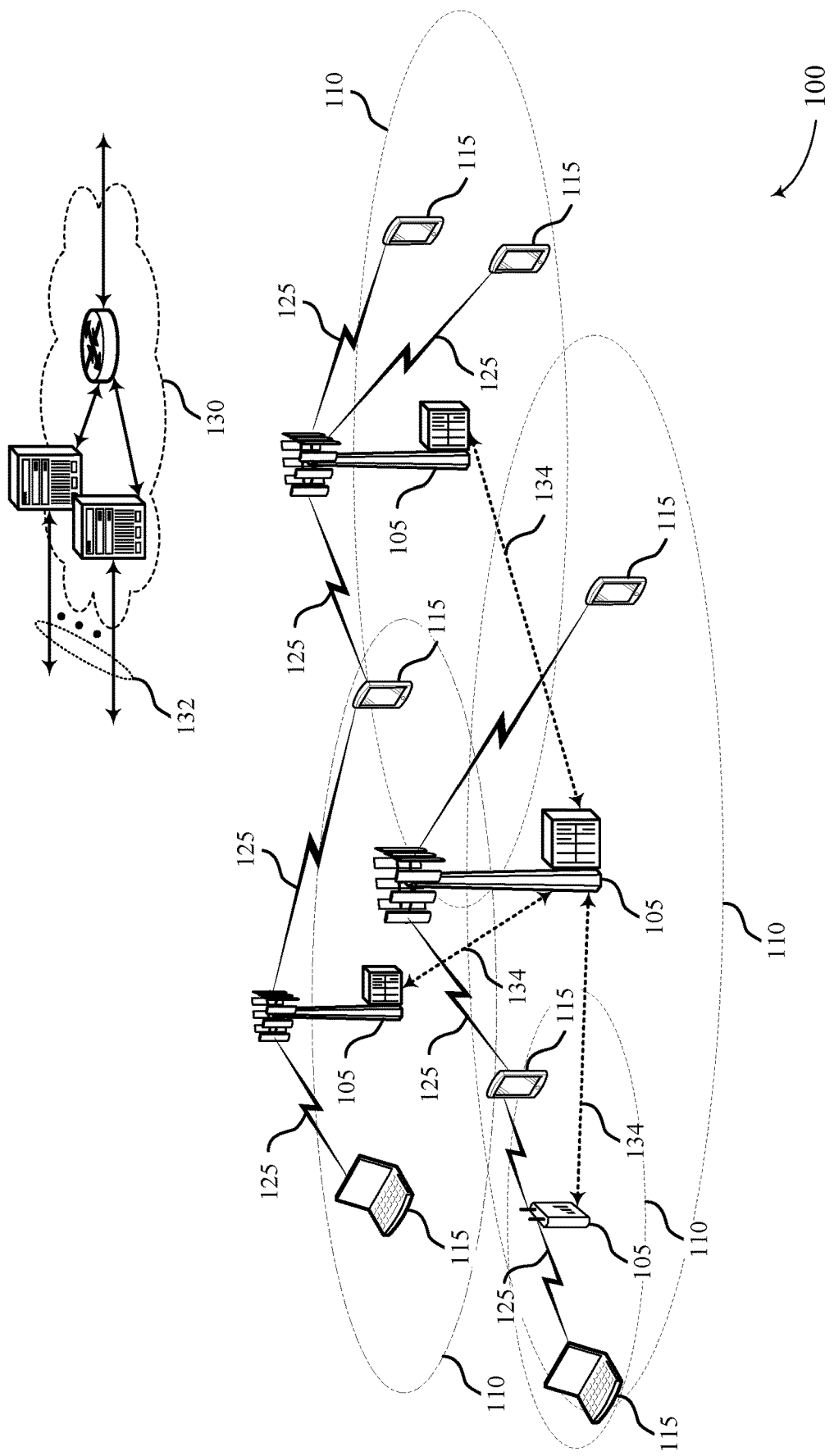
FIGS. 1 and 2 illustrate examples of wireless communications systems that support common search space scrambling for MulteFire coverage enhancement in accordance with aspects of the present disclosure.

In a MulteFire network, it may be appropriate for a UE to establish a MulteFire connection with the network through performing an initial access procedure. As such, a base station may transmit a MIB to the UE which includes system information for the UE to use to access the network and establish the connection. For example, the MIB may include an indication of a downlink system bandwidth to be used for communications between the base station and the UE, an indication of a physical hybrid access request indicator channel (PHICH) configuration, etc. The UE may decode the MIB before completing initial cell acquisition to access the MulteFire network and establish the MulteFire connection. In some aspects, in addition to the MIB, it may be appropriate for the base station to transmit other control information to the UE including additional parameters, configurations, etc. for the UE to use to communicate with the base station.

Accordingly, the base station may configure a physical downlink control channel (PDCCH) in which to transmit the additional control information to the UE. Further, in some aspects (e.g., for wideband coverage extension (WCE)), the base station may also configure an ePDCCH in which to transmit the additional control information to the UE. In some cases, it may be appropriate for the base station to transmit common control information to multiple UEs in the ePDCCH and UE-specific control information to specific UEs in the ePDCCH. As such, the base station 105 may configure one or more common search spaces of the ePDCCH and a UE-specific search space of the ePDCCH. The search spaces may include control channel element (CCE) candidates for a UE to monitor for respective control information from the base station. For example, the UE may monitor CCE candidates of a common search space for common control information from the base station, and the UE may monitor CCE candidates of a UE-specific search space for UE-specific control information from the base station.

In some cases, the base station may configure different types of common search spaces in an ePDCCH in which the base station may transmit different types of common control information to the UE. To limit the number of resources used to transmit the control information in the different types of common search spaces, the base station may allocate overlapping resources for the different types of common search spaces (e.g., a type 0 common search space and a type 1 common search space). In such cases, however, it may be challenging for a UE to differentiate between control information transmitted in a first type of common search space and control information transmitted in a second type of common search space on the overlapping resources. As such, the UE may not be able to identify the control information transmitted in a particular type of common search space, which may be detrimental to a wireless communications system.

As described herein, a base station may support efficient techniques for enabling a UE to differentiate between control information transmitted in different types of common search spaces on overlapping resources. In particular, the base station may encode (e.g., scramble) the control information transmitted in a first type of common search space using a first scrambling sequence, and the base station may encode (e.g., scramble) the control information transmitted in a second type of common search space using a second scrambling sequence that is different from the first scrambling sequence. As such, a receiving UE may be able to determine the different scrambling sequences, and the UE may be able to decode the control information received in a particular common search space using a respective scrambling sequence.

Aspects of the disclosure introduced above are described below in the context of a wireless communications system. Examples of processes and signaling exchanges that support common search space scrambling for MulteFire coverage enhancement are then described. Aspects of the disclosure are further illustrated by and described with reference to apparatus diagrams, system diagrams, and flowcharts that relate to common search space scrambling for MulteFire coverage enhancement.

FIG. 1 illustrates an example of a wireless communications system 100 that supports common search space scrambling for MulteFire coverage enhancement in accordance with various aspects of the present disclosure. The wireless communications system 100 includes base stations 105, UEs 115, and a core network 130. In some examples, the wireless communications system 100 may be a LTE network, an LTE-A network, a NR network, or a MulteFire network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize both licensed and unlicensed radio frequency spectrum bands. For example, wireless communications system 100 may include an LTE/LTE-A network, a MulteFire network, a neutral host small cell network, an NR network, or the like, operating with overlapping coverage areas.

When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation configuration in conjunction with component carriers operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Time intervals in LTE or MulteFire may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a transmission time interval (TTI). In other cases, a TTI may be shorter than a subframe or may be dynamically selected (e.g., in short TTI bursts or in selected component carriers using short TTIs (sTTIs)).

A MulteFire network may include access points (APs) and/or base stations 105 communicating in an unlicensed radio frequency spectrum band, e.g., without a licensed frequency anchor carrier. For example, the MulteFire network may operate without an anchor carrier in the licensed spectrum. In some cases, wireless communications system 100 may support enhanced broadband communications, ultra-reliable (i.e., mission critical) communications, low latency communications, and communications with low-cost and low-complexity devices. In some examples, a MulteFire communications system may support UEs 115 with coverage enhancement mode. Additionally, a MulteFire communications system may include and support different UE types. One UE type may be a legacy UE 115 that may be deficient of capabilities related to a coverage enhancement mode. Additionally, or alternatively, another UE type may be a MulteFire UE 115 that may possess capabilities related to coverage enhancement mode.

In a MulteFire network (e.g., wireless communications system 100), it may be appropriate for a UE 115 to establish a MulteFire connection with the network through performing an initial access procedure. As such, a base station 105 may transmit a MIB to the UE 115 which includes system information for the UE 115 to use to access the network and establish the connection. For example, the MIB may include an indication of a downlink system bandwidth to be used for communicating with the UE 115, an indication of a PHICH configuration, etc. The UE 115 may decode the MIB before completing initial cell acquisition to access the MulteFire network and establish the MulteFire connection. In some aspects, in addition to the MIB, it may be appropriate for the base station 105 to transmit other control information to the UE 115 including additional parameters, configurations, etc. for the UE 115 to use to communicate with the base station 105.

Accordingly, the base station 105 may configure a PDCCH in which the base station 105 may transmit the additional control information to the UE 115. Further, in some aspects (e.g., for WCE), the base station 105 may also configure an ePDCCH in which the base station may transmit the additional control information to the UE 115. In some cases, it may be appropriate for the base station 105 to transmit common control information to multiple UEs 115 in the ePDCCH and UE-specific control information to specific UEs in the ePDCCH. As such, the base station 105 may configure one or more common search spaces of the ePDCCH and a UE-specific search space of the ePDCCH. The search spaces may include CCE candidates for a UE 115 to monitor for respective control information from the base station 105. For example, the UE 115 may monitor CCE candidates of a common search space for common control information from the base station 105, and the UE 115 may monitor CCE candidates of a UE-specific search space for UE-specific control information from the base station 105.

In some cases, the base station 105 may configure different types of common search spaces in an ePDCCH in which the base station 105 may transmit different types of common control information to the UE 115. To limit the number of resources used to transmit the common control information in the different types of common search spaces, the base station 105 may allocate overlapping resources for the different types of common search spaces (e.g., a type 0 common search space and a type 1 common search space). In such cases, however, it may be challenging for a UE 115 to differentiate between control information transmitted in a first type of common search space and control information transmitted in a second type of common search space on the overlapping resources. As such, the UE 115 may not be able to identify the control information transmitted in a particular type of common search space, which may be detrimental to a wireless communications system. A base station 105 within wireless communications system 100 may support efficient techniques for enabling a UE 115 to differentiate between control information transmitted in different types of common search spaces on overlapping resources.

Figure 2:
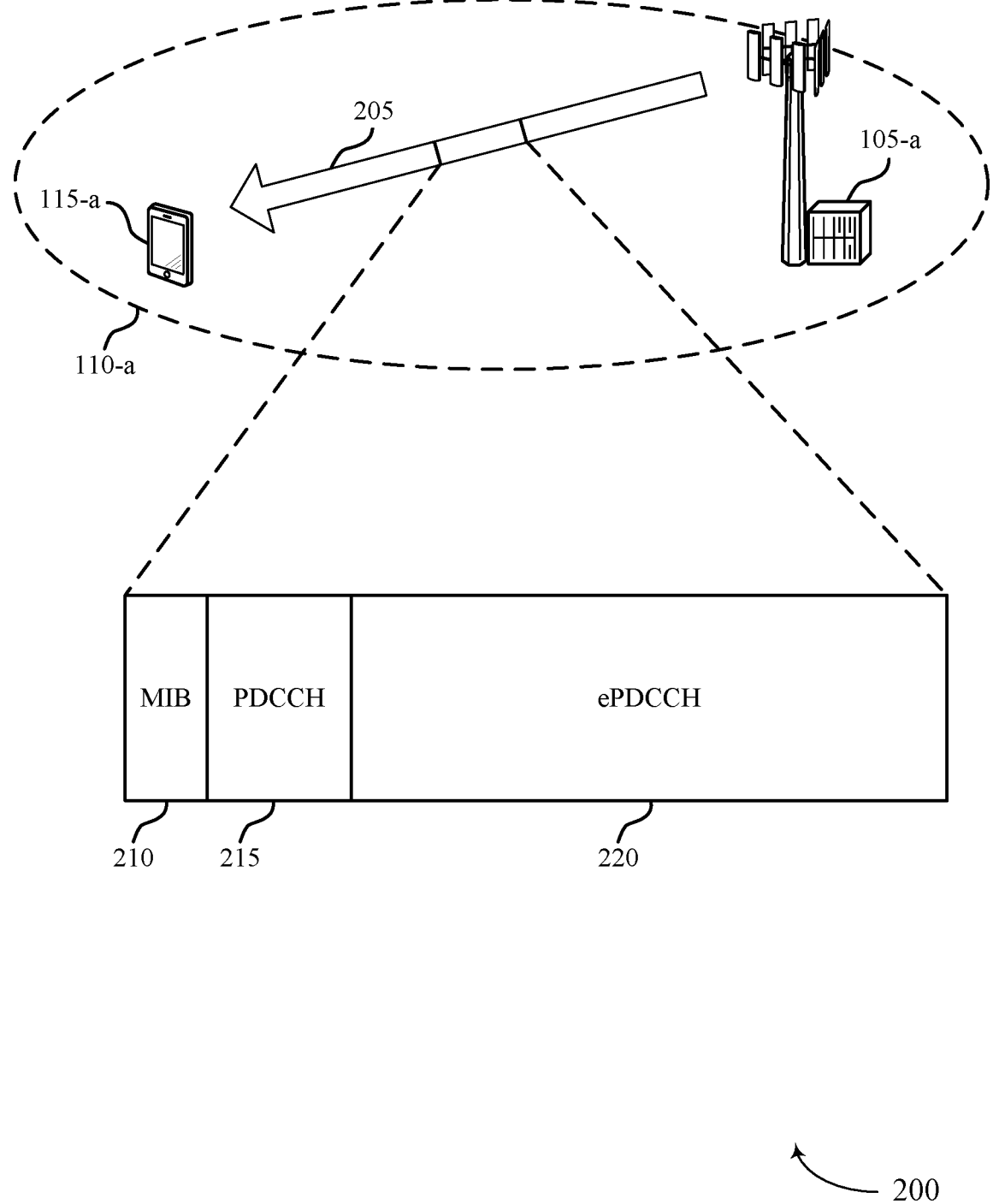

FIG. 2 illustrates an example of a wireless communications system 200 that supports common search space scrambling for MulteFire coverage enhancement in accordance with various aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. For example, base station 105-a may communicate with UE 115-a on resources of a carrier 205. Wireless communications system 200 may implement aspects of wireless communications system 100. For example, wireless communications system 200 may be a MulteFire network.

In wireless communications system 200, base station 105-a may transmit a MIB 210 to UE 115-a which includes system information for UE 115-a to use to access the network. For example, the MIB 210 may include an indication of a downlink system bandwidth used for communicating with UE 115-a, an indication of a PHICH configuration, etc. UE 115-a may decode the MIB 210 to identify the control information for establishing a MulteFire connection with a MulteFire network through base station 105-a. In some cases, it may be appropriate for base station 105-a to transmit additional control information to UE 115-a including additional parameters, configurations, etc. for UE 115-a to use to communicate with base station 105-a.

Accordingly, base station 105-a may allocate additional resources for transmitting the additional control information to UE 115. In particular, base station 105-a may allocate resources for a PDCCH 215 in which base station 105-a may transmit the additional control information to UE 115-*a*. In some aspects, base station 105-*a* may transmit different types of control information to UE 115-*a* in the PDCCH 215. Each type of control information (e.g., each grant) may be transmitted at an appropriate aggregation level (e.g., aggregation level 8) such that base station 105-*a* may be able to transmit several different types of control information (e.g., different grants) to the UE 115 in the PDCCH 215. The aggregation level may correspond to a number of CCEs used to transmit the different types of control information to UE 115-*a* in the PDCCH 215.

In some cases, UE 115-*a* (e.g., a WCE UE 115) may experience difficulty receiving the control information in the PDCCH 215. Accordingly, it may be appropriate for base station 105-*a* to transmit the different types of control information (e.g., different grants) in the PDCCH 215 at increased aggregation levels (e.g., to facilitate coverage enhancement). However, the base station 105 may not have access to sufficient resources to transmit the different types of control information in the PDCCH 215 at the increased aggregation levels (e.g., 64). Thus, as described herein, base station 105-*a* may configure an ePDCCH 220 to gain access to additional resources for transmitting the different types of control information to UE 115-*a* at increased aggregation levels (e.g., to facilitate coverage enhancement). The configuration of the ePDCCH 220 may be indicated in MIB 210, and UE 115-*a* (e.g., a WCE UE 115) may decode the MIB 210 to identify the configuration of the ePDCCH 220.

In some aspects, it may be appropriate for base station 105-*a* to transmit common control information to multiple UEs (e.g., including UE 115-*a*) in ePDCCH 220 and UE-specific control information to specific UEs in ePDCCH 220. As such, base station 105-*a* may configure one or more common search spaces in ePDCCH 220 in which base station 105-*a* may transmit the common control information to the multiple UEs, and base station 105-*a* may configure a UE-specific search space in ePDCCH 220 in which base station 105-*a* may transmit the UE-specific control information to specific UEs (e.g., UE 115-*a*). Base station 105-*a* may then transmit the common control information to UE 115-*a* in the one or more common search spaces, and base station 105-*a* may transmit the UE-specific control information to UE 115-*a* in the UE-specific search space.

Figure 3:
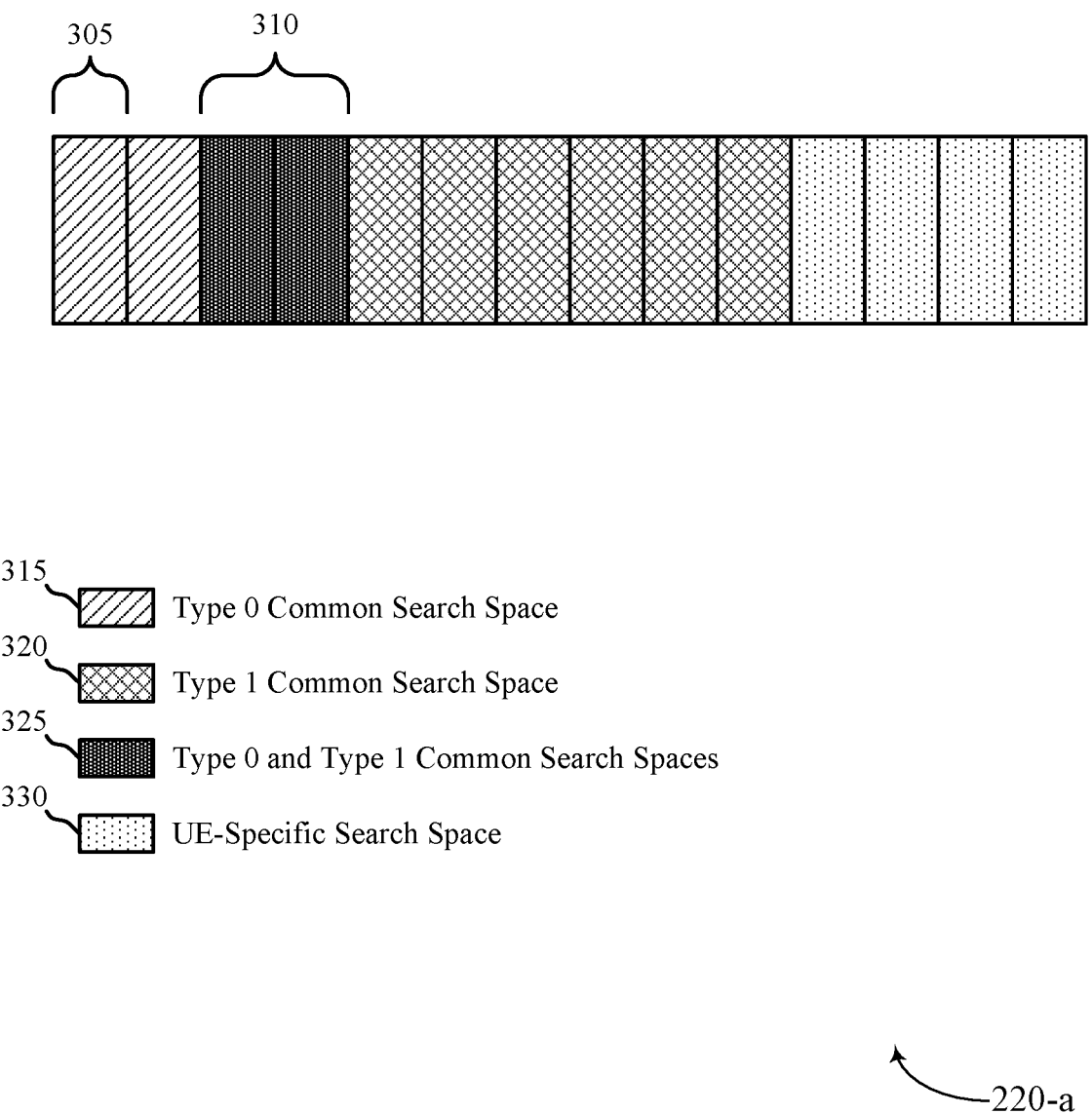
FIG. 3 illustrates an example structure of an ePDCCH in accordance with aspects of the present disclosure.

FIG. 3 illustrates an example structure of an ePDCCH 220-*a* in accordance with various aspects of the present disclosure. In the example of FIG. 3, base station 105-*a* may configure two types of common search spaces and a UE-specific search space in ePDCCH 220. In particular, base station 105-*a* may configure a type 0 common search space 315, a type 1 common search space 320 and a UE-specific search space 330 in ePDCCH 220-*a*. Thus, base station 105-*a* may transmit a first set of common control information in type 0 common search space 315 and a second set of common control information in type 1 common search space 320. In addition, base station 105-*a* may transmit UE-specific control information to UE 115-*a* in UE-specific search space 330. In some cases, base station 105-*a* may transmit a configuration of type 0 common search space 315 in MIB 210, and UE 115-*a* may decode the MIB 210 to identify the configuration of type 0 common search space 315.

Base station 105-*a* may then transmit a grant for a SIB-MF1 in type 0 common search space 315, and UE 115-*a* may receive the grant and determine a resource allocation for the SIB-MF1 (e.g., in a physical downlink shared channel (PDSCH)) scheduled by the grant. In addition to other control information, the SIB-MF1 may include configuration information for type 1 common search space 320. Base station 105-*a* may transmit control information in the type 1 common search space 320 to UE 115-*a* including, for example, one or more grants for other SIBs, frame structure information, a random access message, a paging message, a TPC message, etc.

The search spaces described above may span multiple groups of resource blocks 305, where each group of resource blocks includes a set number of resource blocks (e.g., 4). In some cases, to limit the amount of resources (i.e., overhead) used to transmit common control information to UE 115-*a*, base station 105-*a* may allocate overlapping resources 310 (e.g., overlapping resource blocks) for the transmission of common control information in different types of common search spaces. That is, base station 105-*a* may transmit common control information in type 0 and type 1 common search spaces 325 on overlapping resources 310. In such cases, however, it may be challenging for UE 115-*a* to differentiate between the common control information transmitted in type 0 common search space 315 and the common control information transmitted in type 1 common search space 320.

As described herein, base station 105-*a* may support efficient techniques for enabling UE 115-*a* to differentiate between the control information transmitted in type 0 common search space 315 and the control information transmitted in type 1 common search space 320. Specifically, base station 105-*a* may encode the control information transmitted in type 0 common search space 315 using a first scrambling sequence, and base station 105-*a* may encode the control information transmitted in type 1 common search space 325 using a second scrambling sequence that is different from the first scrambling sequence. Thus, UE 115-*a* may receive the control information in type 0 and type 1 common search spaces 325 on overlapping resources 310, and UE 115-*a* may decode the control information received in type 0 common search space 315 based on the first scrambling sequence and the control information received in type 1 common search space 320 based on the second scrambling sequence.

In order to ensure that the common control information can be decoded by multiple UEs, base station 105-*a* may encode the control information transmitted in type 0 common search space 315 and type 1 common search space 320 using scrambling sequences that can be determined by the multiple UEs. For instance, base station 105-*a* may determine the scrambling sequences based on a cell ID of base station 105-*a*. Because the multiple UEs may receive an indication of the cell ID of base station 105-*a* (e.g., in a synchronization signal block), the UEs may be able to determine the scrambling sequences used to encode the control information received from base station 105-*a*. As an example, the first scrambling sequence used to encode the control information transmitted in type 0 common search space 315 may be determined based on initializing a scrambling sequence generator with a value determined based on the cell ID (e.g., cell ID+0). And the second scrambling sequence used to encode the control information transmitted in type 1 common search space 320 may be determined based on initializing a scrambling sequence generator with another value determined based on the cell ID (e.g., cell ID+505).

Although the examples described with reference to FIG. 3 discuss a type 0 common search space 315 spanning 16 resource blocks and a type 1 common search space 320 spanning 32 resource block, it is to be understood that the type 0 common search space 315 and the type 1 common search space 320 may span a wide range of resource blocks. Further, although the examples described above discuss that the type 0 common search space 315 and the type 1 common search space 320 overlap on eight resource blocks, it is to be understood that the type 0 common search space 315 and the type 1 common search space 320 may overlap on a wide range of resource blocks. In addition, although the examples discussed above describe search spaces within an ePDCCH 220, it is to be understood that the search spaces may span a set of resources allocated for the ePDCCH 220, and the search spaces may be monitored to identify the ePDCCH 220. In some cases, the ePDCCH 220 used to transmit the control information in one search space (e.g., a common search space) may be different from the ePDCCH 220 used to transmit the control information in another search space (e.g., a UE-specific search space).

Figure 4:
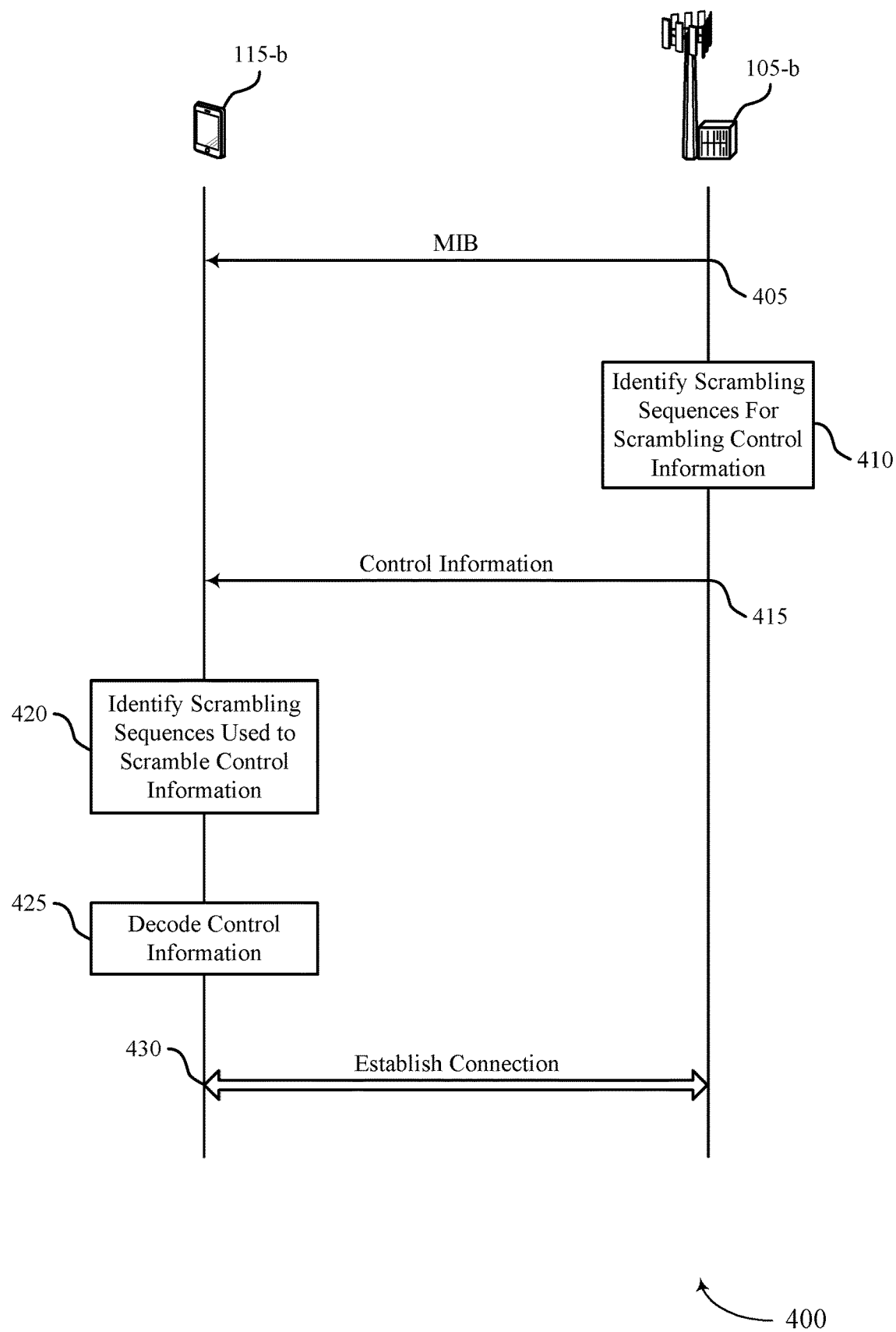
FIG. 4 illustrates an example of a process flow that supports common search space scrambling for MulteFire coverage enhancement in accordance with aspects of the present disclosure.

FIG. 4 illustrates an example of a process flow 400 that supports common search space scrambling for MulteFire coverage enhancement in accordance with various aspects of the present disclosure. Process flow 400 illustrates aspects of techniques performed by base station 105-b, which may be an example of a base station 105 described with reference to FIGS. 1-3. Process flow 400 also illustrates aspects of techniques performed by a UE 115-b, which may be an example of a UE 115 described with reference to FIGS. 1-3.

In the example of FIG. 4, base station 105-b may identify control information to transmit to UE 115-b in a first common search space of a first type (e.g., a type 0 common search space) and control information to transmit to UE 115-b in a second common search space of a second type (e.g., a type 1 common search space). In this example, the resources allocated for the first common search space may overlap with the resources allocated for the second common search space. At 405, base station 105-b may transmit a MIB to UE 115-b that identifies a resource allocation of the first common search space.

At 410, base station 105-b may identify a first scrambling sequence for encoding control information to transmit in the first common search space and a second scrambling sequence for encoding control information to transmit in the second common search space. In some cases, the first scrambling sequence and the second scrambling sequence may be determined based on a cell ID of base station 105-b. Base station 105-b may then encode the control information to transmit in the first common search space using the first scrambling sequence and the control information to transmit in the second common search space using the second scrambling sequence, and, at 415, base station 105-b may transmit the encoded control information to UE 115-b.

UE 115-a may then identify a resource allocation for the first common search space (e.g., based on the MIB received at 405) and a resource allocation for the second common search space (e.g., based on control information in the first common search space). At 420, UE 115-a may identify the first scrambling sequence used to scramble control information in the first common search space and the second scrambling sequence used to scramble control information in the second common search space. At 425, UE 115-a may then decode the control information in the first common search space based on the first scrambling sequence and the control information in the second common search space based on the second scrambling sequence, and, at 430, UE 115-b may establish a connection with a MulteFire network through base station 105-b based on the decoded control information.

Figure 5:
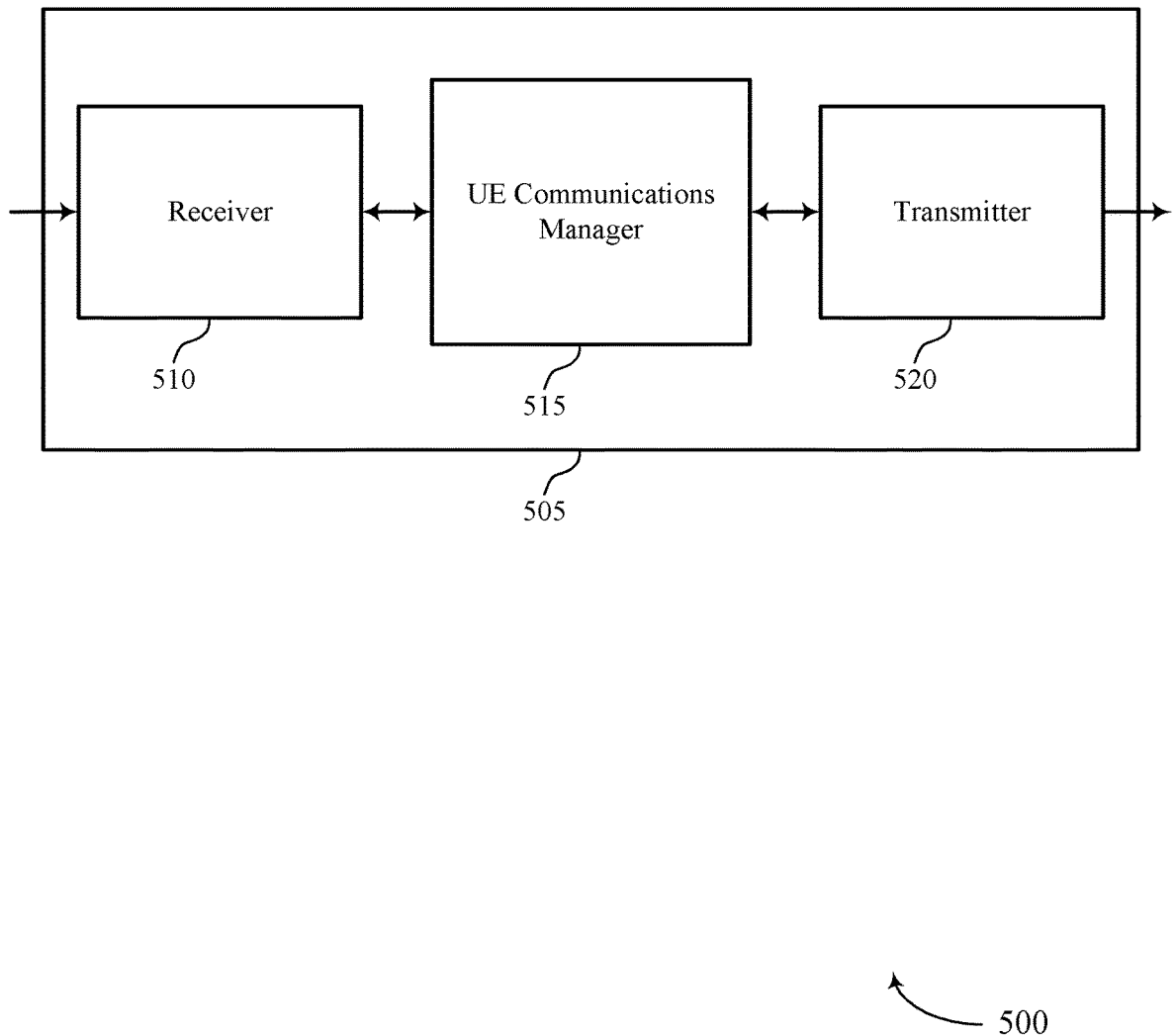
FIGS. 5 and 6 show block diagrams of a device that supports common search space scrambling for MulteFire coverage enhancement in accordance with aspects of the present disclosure.

FIG. 5 shows a block diagram 500 of a wireless device 505 that supports common search space scrambling for MulteFire coverage enhancement in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to common search space scrambling for MulteFire coverage enhancement, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify a first common search space of a first type and a second common search space of a second type to monitor for control information from a base station, where resources allocated for the first common search space overlap with resources allocated for the second common search space, determine a first scrambling sequence used to scramble control information in the first common search space and a second scrambling sequence used to scramble control information in the second common search space, and decode the control information in the first common search space based on the first scrambling sequence or the control information in the second common search space based on the second scrambling sequence.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
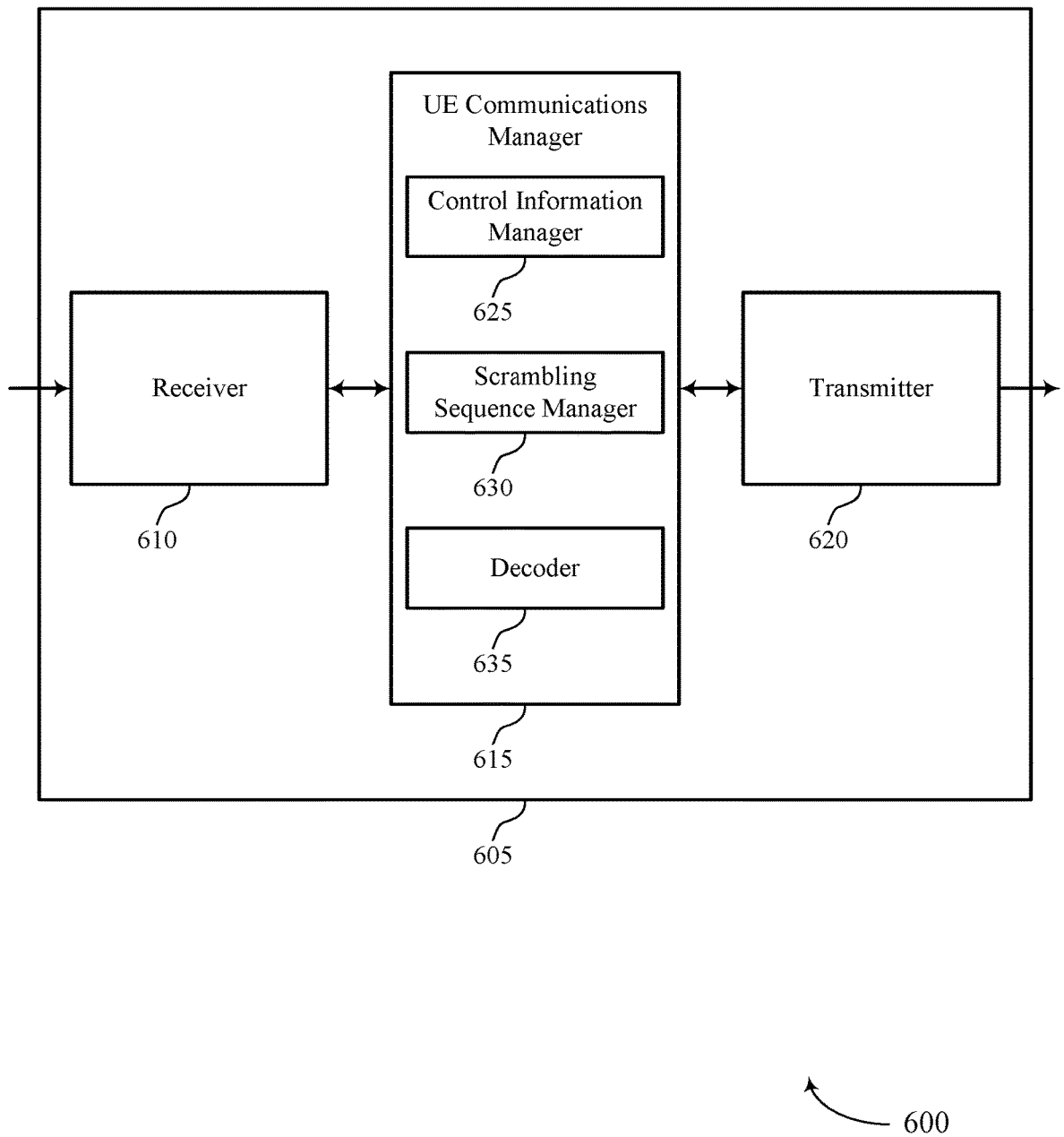

FIG. 6 shows a block diagram 600 of a wireless device 605 that supports common search space scrambling for MulteFire coverage enhancement in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to common search space scrambling for MulteFire coverage enhancement, etc.). Information may be passed on to other components of the device. The receiver 610 may be an example of aspects of the transceiver 735 described with reference to FIG. 7. The receiver 610 may utilize a single antenna or a set of antennas.

UE communications manager 615 may be an example of aspects of the UE communications manager 715 described with reference to FIG. 7. UE communications manager 615 may include control information manager 625, scrambling sequence manager 630, and decoder 635.

Control information manager 625 may identify a first common search space of a first type and a second common search space of a second type to monitor for control information from a base station, where resources allocated for the first common search space overlap with resources allocated for the second common search space. Scrambling sequence manager 630 may determine a first scrambling sequence used to scramble control information in the first common search space and a second scrambling sequence used to scramble control information in the second common search space. In some cases, determining the first scrambling sequence and the second scrambling sequence includes determining the first scrambling sequence and the second scrambling sequence based on a cell identifier of the base station. Decoder 635 may decode the control information in the first common search space based on the first scrambling sequence or the control information in the second common search space based on the second scrambling sequence. In some cases, the decoding includes blind decoding.

In some cases, control information manager 625 may receive, from the base station, a MIB that identifies a resource allocation of the first common search space. In some cases, control information manager 625 may identify a SIB-MF1 grant in the control information in the first common search space and decode a SIB-MF1 scheduled by the SIB-MF1 grant. In some cases, control information manager 625 may determine a resource allocation of the second common search space based on the decoded SIB-MF1, In some cases, control information manager 625 may identify one or more grants for other SIBs, frame structure information, a random access message, a paging message, a TPC message, or a combination thereof in the control information in the second common search space. In some cases, the first common search space of the first type includes a type-0 common search space, and the second common search space of the second type includes a type-1 common search space. In some cases, the control information in the first common search space and the second common search space is received in an ePDCCH.

Transmitter 620 may transmit signals generated by other components of the device. In some examples, the transmitter 620 may be collocated with a receiver 610 in a transceiver module. For example, the transmitter 620 may be an example of aspects of the transceiver 735 described with reference to FIG. 7. The transmitter 620 may utilize a single antenna or a set of antennas.

Figure 7:
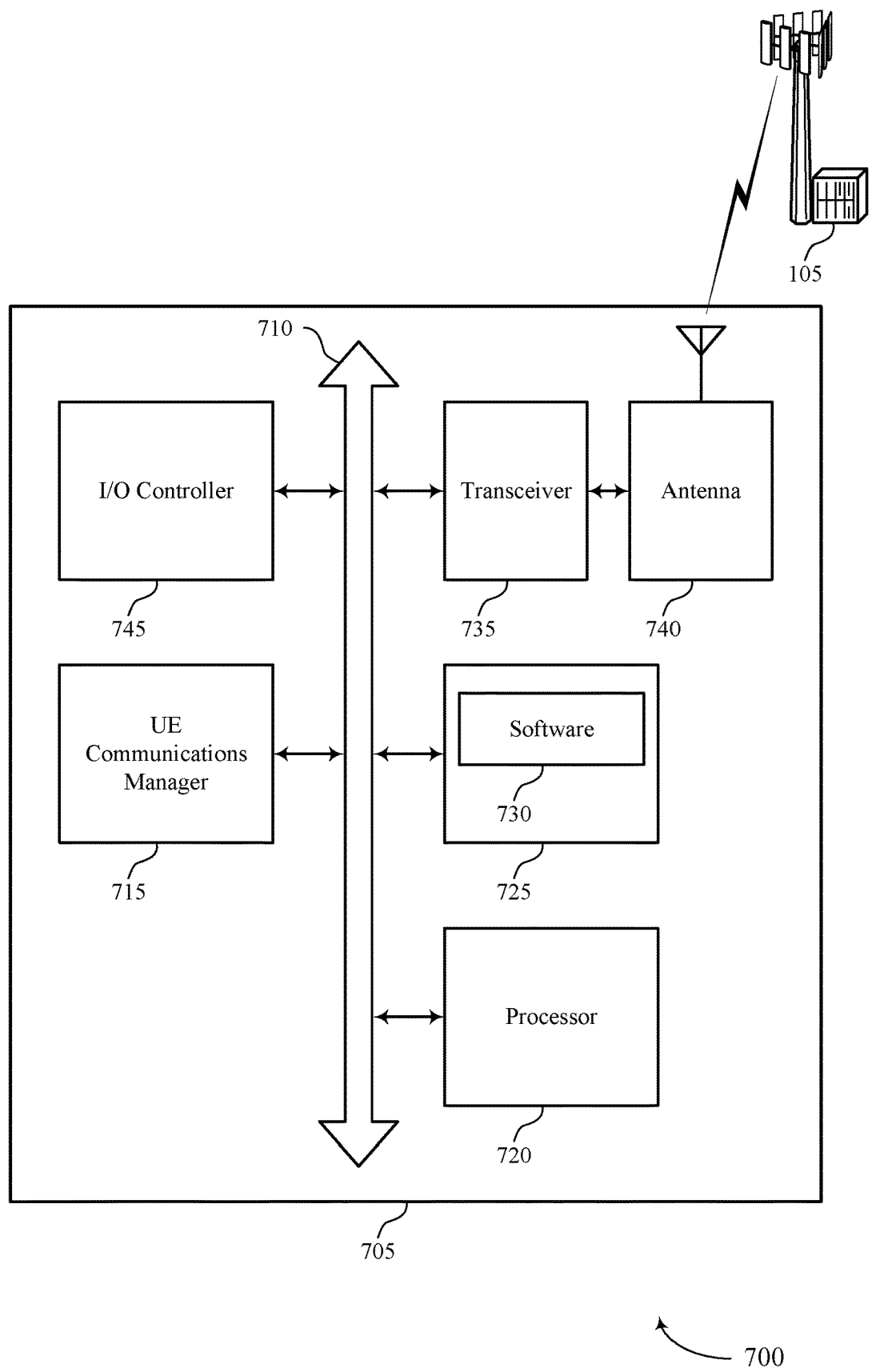
FIG. 7 illustrates a block diagram of a system including a UE that supports common search space scrambling for MulteFire coverage enhancement in accordance with aspects of the present disclosure.

FIG. 7 shows a diagram of a system 700 including a device 705 that supports common search space scrambling for MulteFire coverage enhancement in accordance with aspects of the present disclosure. Device 705 may be an example of or include the components of wireless device 505, wireless device 605, or a UE 115 as described above, e.g., with reference to FIGS. 5 and 6. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting common search space scrambling for MulteFire coverage enhancement).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support common search space scrambling for MulteFire coverage enhancement. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
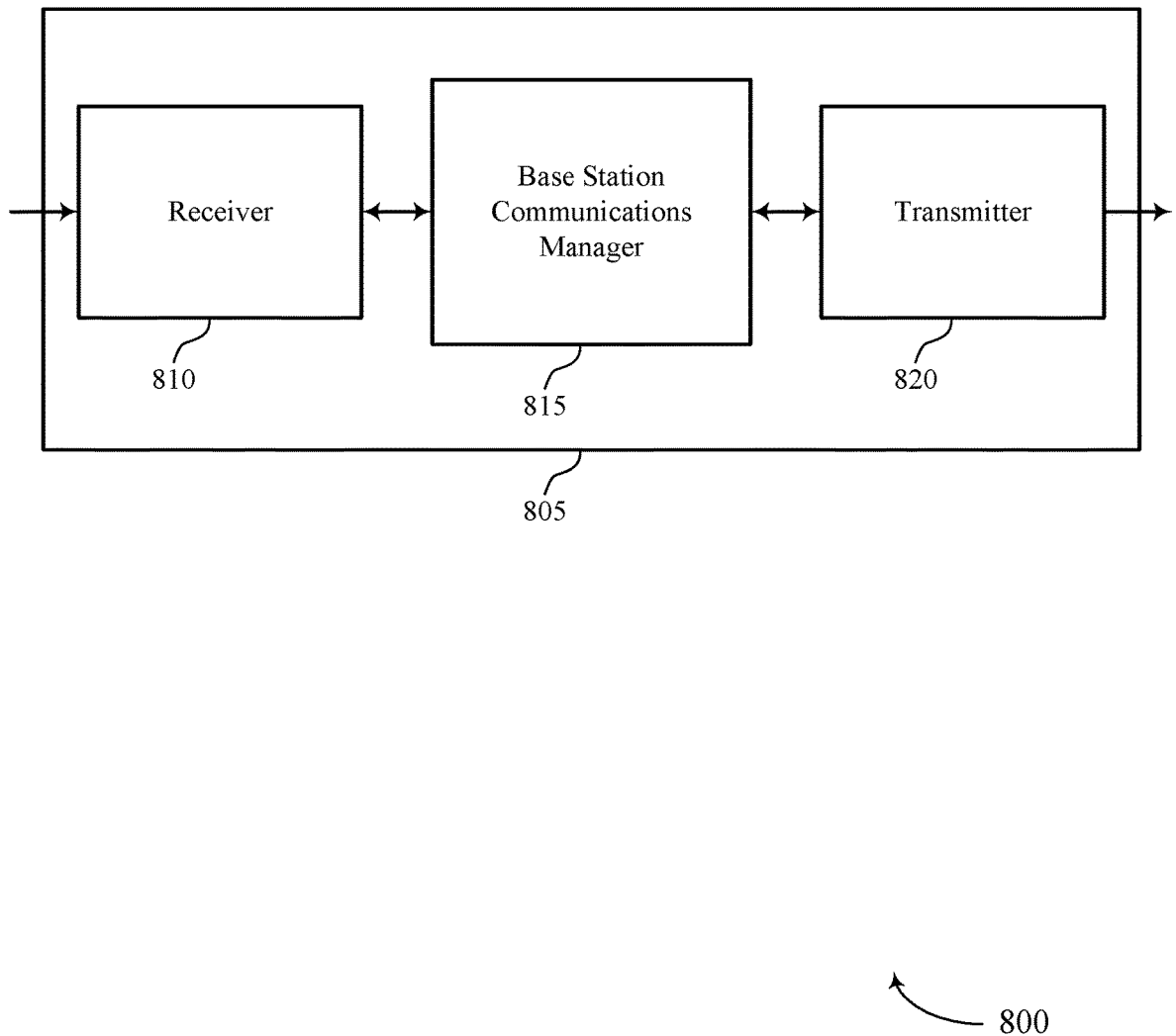
FIGS. 8 and 9 show block diagrams of a device that supports common search space scrambling for MulteFire coverage enhancement in accordance with aspects of the present disclosure.

FIG. 8 shows a block diagram 800 of a wireless device 805 that supports common search space scrambling for MulteFire coverage enhancement in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to common search space scrambling for MulteFire coverage enhancement, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may identify control information to transmit in a first common search space of a first type and control information to transmit in a second common search space of a second type, where resources allocated for the first common search space overlap with resources allocated for the second common search space and encode the control information to transmit in the first common search space using a first scrambling sequence and the control information to transmit in the second common search space using a second scrambling sequence. Base station communications manager 815 may then coordinate with transmitter 820 to transmit the control information encoded using the first scrambling sequence in the first common search space and the control information encoded using the second scrambling sequence in the second common search space.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
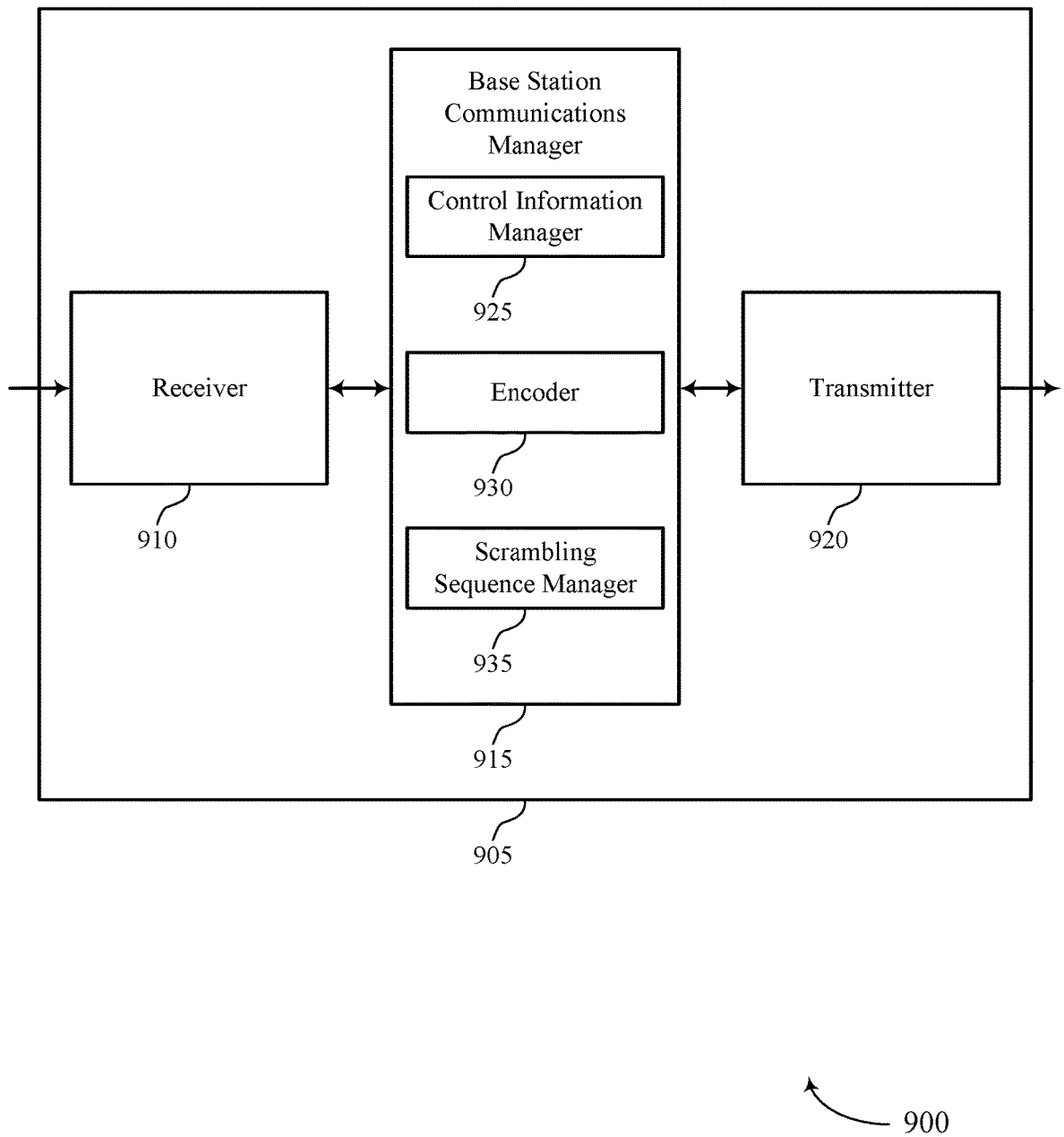

FIG. 9 shows a block diagram 900 of a wireless device 905 that supports common search space scrambling for MulteFire coverage enhancement in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to common search space scrambling for MulteFire coverage enhancement, etc.). Information may be passed on to other components of the device. The receiver 910 may be an example of aspects of the transceiver 1035 described with reference to FIG. 10. The receiver 910 may utilize a single antenna or a set of antennas.

Base station communications manager 915 may be an example of aspects of the base station communications manager 1015 described with reference to FIG. 10. Base station communications manager 915 may include control information manager 925 and encoder 930.

Control information manager 925 may identify control information to transmit in a first common search space of a first type and control information to transmit in a second common search space of a second type, where resources allocated for the first common search space overlap with resources allocated for the second common search space. Encoder 930 may encode the control information to transmit in the first common search space using a first scrambling sequence and the control information to transmit in the second common search space using a second scrambling sequence. Scrambling sequence manager 935 may determine the first scrambling sequence and the second scrambling sequence based on a cell identifier of the base station. Encoder 930 may then coordinate with transmitter 920 to transmit the control information encoded using the first scrambling sequence in the first common search space and the control information encoded using the second scrambling sequence in the second common search space.

In some cases, control information manager 925 may transmit a MIB that identifies a resource allocation of the first common search space. In some cases, control information manager 925 may transmit a SIB-MF1 grant in the control information in the first common search space. In some cases, control information manager 925 may transmit an indication of a resource allocation of the second common search space in a SIB-MF1 scheduled by the SIB-MF1 grant. In some cases, control information manager 925 may transmit one or more grants for other SIBs, frame structure information, a random access message, a paging message, a TPC message, or a combination thereof in the control information in the second common search space. In some cases, the first common search space of the first type includes a type-0 common search space, and the second common search space of the second type includes a type-1 common search space. In some cases, the control information in the first common search space and the second common search space is transmitted in an ePDCCH.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas.

Figure 10:
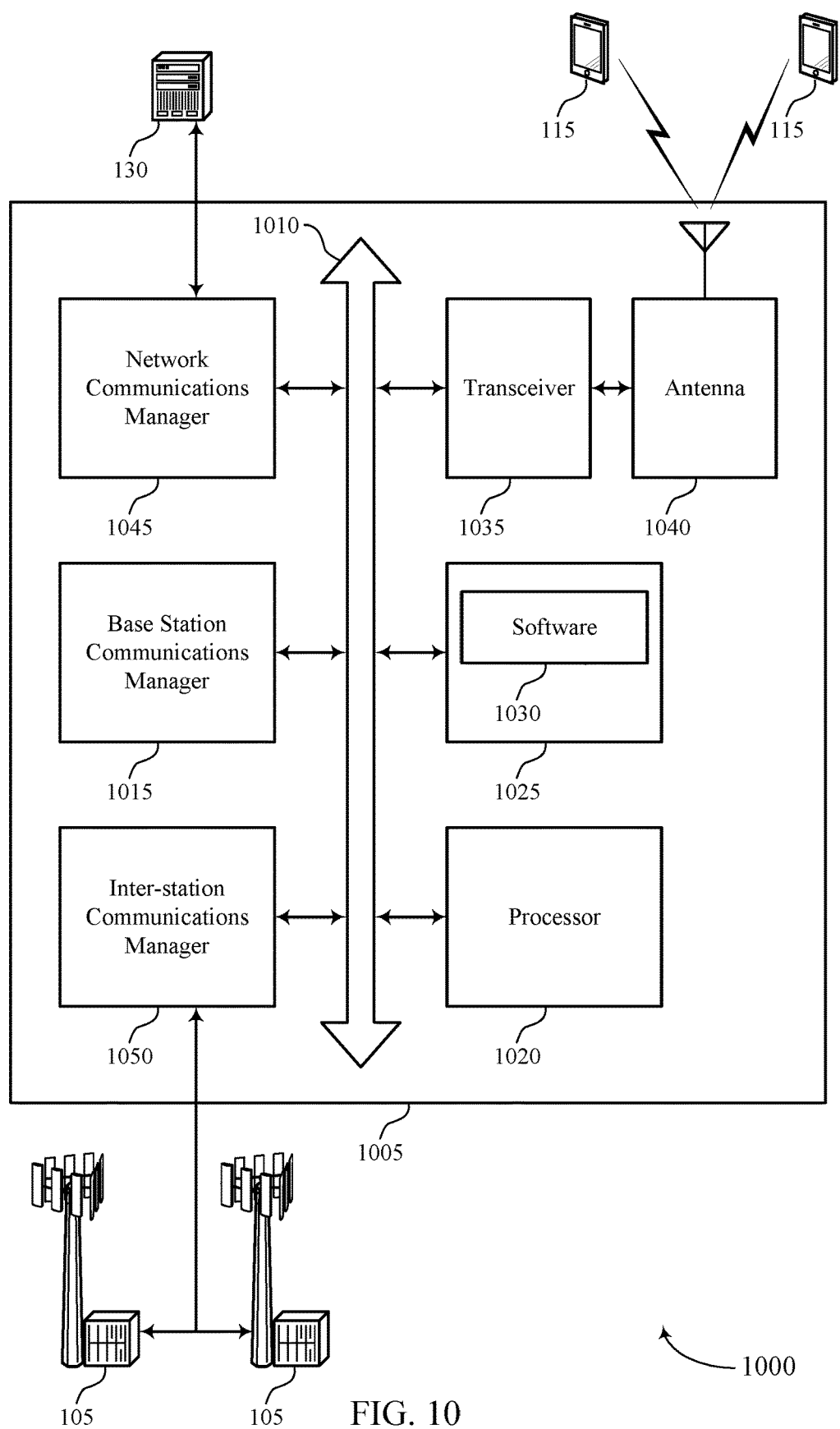
FIG. 10 illustrates a block diagram of a system including a base station that supports common search space scrambling for MulteFire coverage enhancement in accordance with aspects of the present disclosure.

FIG. 10 shows a diagram of a system 1000 including a device 1005 that supports common search space scrambling for MulteFire coverage enhancement in accordance with aspects of the present disclosure. Device 1005 may be an example of or include the components of base station 105 as described above, e.g., with reference to FIG. 1. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting common search space scrambling for MulteFire coverage enhancement).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support common search space scrambling for MulteFire coverage enhancement. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
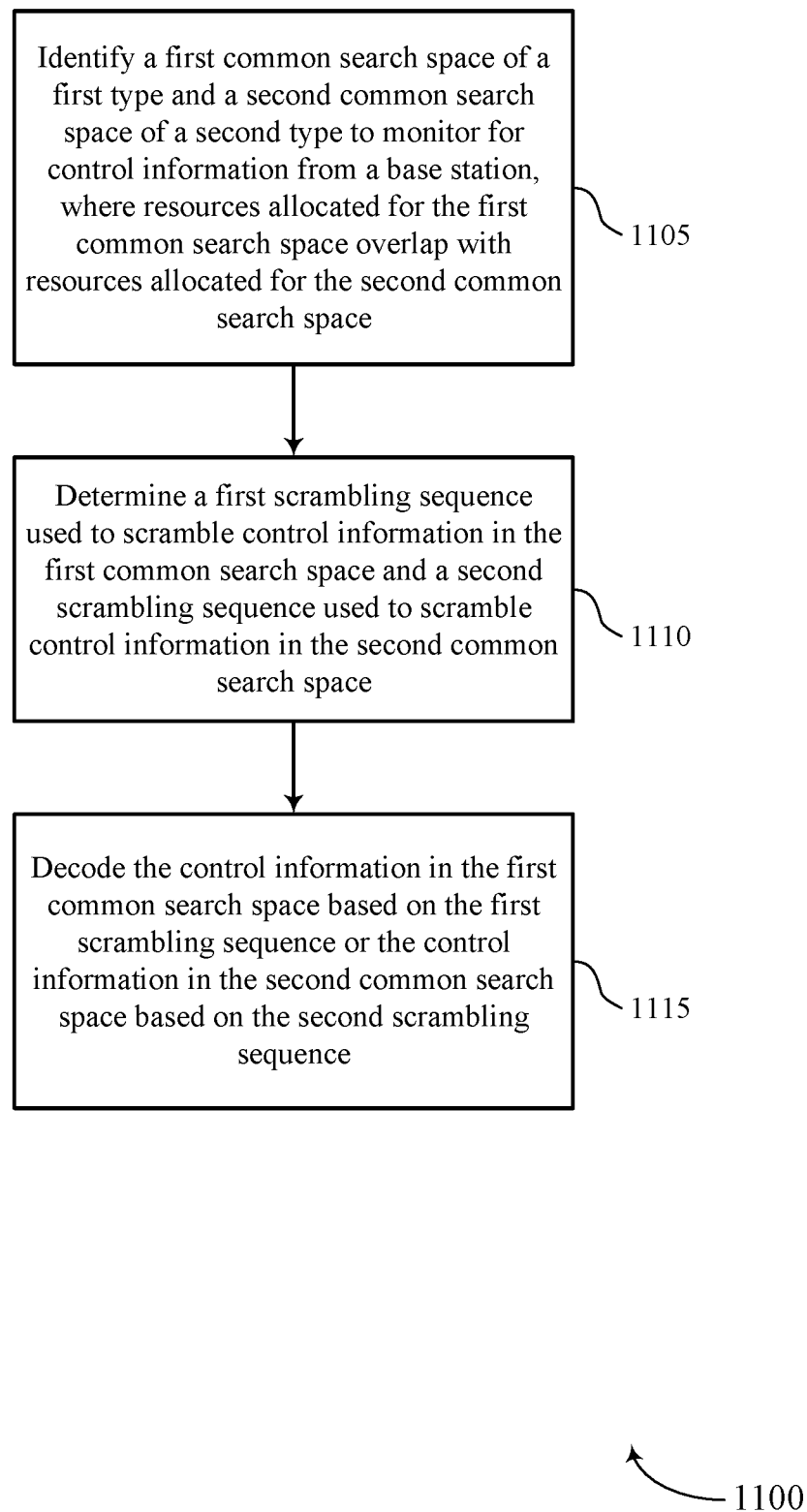
FIGS. 11 and 12 show flowcharts illustrating methods for common search space scrambling for MulteFire coverage enhancement in accordance with aspects of the present disclosure.

FIG. 11 shows a flowchart illustrating a method 1100 for common search space scrambling for MulteFire coverage enhancement in accordance with aspects of the present disclosure. The operations of method 1100 may be implemented by a UE 115 or its components as described herein. For example, the operations of method 1100 may be performed by a UE communications manager as described with reference to FIGS. 5 through 7. In some examples, a UE 115 may execute a set of codes to control the functional elements of the device to perform the functions described below. Additionally, or alternatively, the UE 115 may perform aspects of the functions described below using special-purpose hardware.

At 1105 the UE 115 may identify a first common search space of a first type and a second common search space of a second type to monitor for control information from a base station, wherein resources allocated for the first common search space overlap with resources allocated for the second common search space. The operations of 1105 may be performed according to the methods described herein. In certain examples, aspects of the operations of 1105 may be performed by a control information manager as described with reference to FIGS. 5 through 7.

At 1110 the UE 115 may determine a first scrambling sequence used to scramble control information in the first common search space and a second scrambling sequence used to scramble control information in the second common search space. The operations of 1110 may be performed according to the methods described herein. In certain examples, aspects of the operations of 1110 may be performed by a scrambling sequence manager as described with reference to FIGS. 5 through 7.

At 1115 the UE 115 may decode the control information in the first common search space based at least in part on the first scrambling sequence or the control information in the second common search space based at least in part on the second scrambling sequence. The operations of 1115 may be performed according to the methods described herein. In certain examples, aspects of the operations of 1115 may be performed by a decoder as described with reference to FIGS. 5 through 7.

Figure 12:
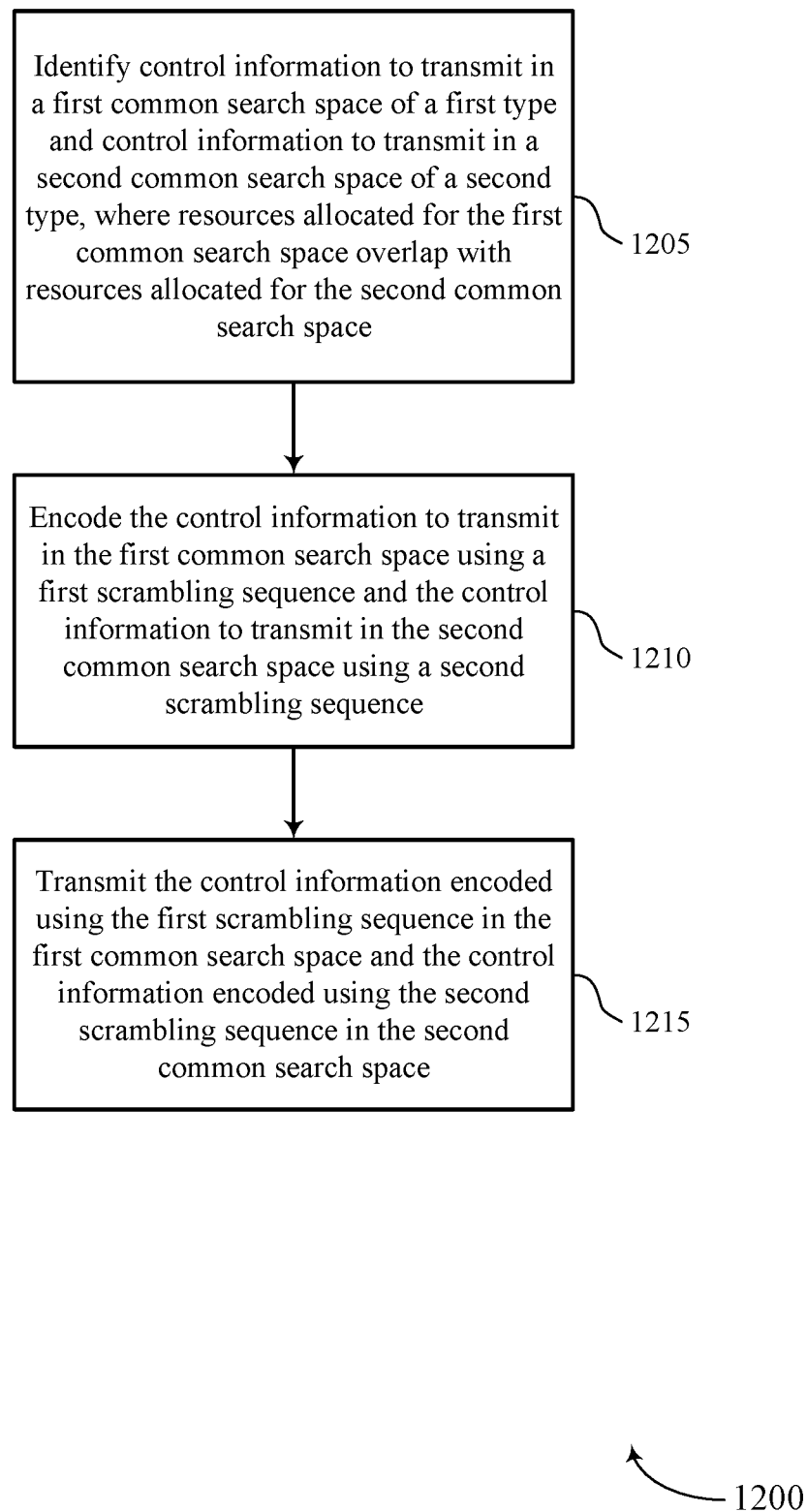

FIG. 12 shows a flowchart illustrating a method 1200 for common search space scrambling for MulteFire coverage enhancement in accordance with aspects of the present disclosure. The operations of method 1200 may be implemented by a base station 105 or its components as described herein. For example, the operations of method 1200 may be performed by a base station communications manager as described with reference to FIGS. 8 through 10. In some examples, a base station 105 may execute a set of codes to control the functional elements of the device to perform the functions described below. Additionally, or alternatively, the base station 105 may perform aspects of the functions described below using special-purpose hardware.

At 1205 the base station 105 may identify control information to transmit in a first common search space of a first type and control information to transmit in a second common search space of a second type, wherein resources allocated for the first common search space overlap with resources allocated for the second common search space. The operations of 1205 may be performed according to the methods described herein. In certain examples, aspects of the operations of 1205 may be performed by a control information manager as described with reference to FIGS. 8 through 10.

At 1210 the base station 105 may encode the control information to transmit in the first common search space using a first scrambling sequence and the control information to transmit in the second common search space using a second scrambling sequence. The operations of 1210 may be performed according to the methods described herein. In certain examples, aspects of the operations of 1210 may be performed by an encoder as described with reference to FIGS. 8 through 10.

At 1215 the base station 105 may transmit the control information encoded using the first scrambling sequence in the first common search space and the control information encoded using the second scrambling sequence in the second common search space. The operations of 1215 may be performed according to the methods described herein. In certain examples, aspects of the operations of 1215 may be performed by a transmitter as described with reference to FIGS. 8 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a first common search space of a first type and a second common search space of a second type to monitor for control information from a base station, wherein resources allocated for the first common search space overlap with resources allocated for the second common search space;
    determining a first scrambling sequence used to scramble control information in the first common search space and a second scrambling sequence used to scramble control information in the second common search space; and
    decoding the control information in the first common search space based at least in part on the first scrambling sequence or the control information in the second common search space based at least in part on the second scrambling sequence.

2. The method of claim 1, wherein determining the first scrambling sequence and the second scrambling sequence comprises:
    determining the first scrambling sequence and the second scrambling sequence based at least in part on a cell identifier of the base station.

3. The method of claim 1, wherein the decoding comprises blind decoding.

4. The method of claim 1, further comprising:
    receiving, from the base station, a master information block (MIB) that identifies a resource allocation of the first common search space.

5. The method of claim 4, further comprising:
    identifying a Multefire system information block (SIB) (SIB-MF1) grant in the control information in the first common search space; and
    decoding a SIB-MF1 scheduled by the SIB-MF1 grant.

6. The method of claim 5, further comprising:
    determining a resource allocation of the second common search space based at least in part on the decoded SIB-MF1.

7. The method of claim 6, further comprising:
identifying one or more grants for other SIBs, frame structure information, a random access message, a paging message, a transmit power control (TPC) message, or a combination thereof in the control information in the second common search space.

8. The method of claim 1, wherein the first common search space of the first type comprises a type-0 common search space, and the second common search space of the second type comprises a type-1 common search space.

9. The method of claim 1, wherein the control information in the first common search space and the second common search space is received in an enhanced physical downlink control channel (ePDCCH).

10. The method of claim 1, wherein the first scrambling sequence is different from the second scrambling sequence.

11. A method for wireless communication at a base station, comprising:
identifying control information to transmit in a first common search space of a first type and control information to transmit in a second common search space of a second type, wherein resources allocated for the first common search space overlap with resources allocated for the second common search space;
encoding the control information to transmit in the first common search space using a first scrambling sequence and the control information to transmit in the second common search space using a second scrambling sequence; and
transmitting the control information encoded using the first scrambling sequence in the first common search space and the control information encoded using the second scrambling sequence in the second common search space.

12. The method of claim 11, further comprising:
determining the first scrambling sequence and the second scrambling sequence based at least in part on a cell identifier of the base station.

13. The method of claim 11, further comprising:
transmitting a master information block (MIB) that identifies a resource allocation of the first common search space.

14. The method of claim 13, further comprising:
transmitting a Multefire system information block (SIB) (SIB-MF1) grant in the control information in the first common search space.

15. The method of claim 14, further comprising:
transmitting an indication of a resource allocation of the second common search space in a SIB-MF1 scheduled by the SIB-MF1 grant.

16. The method of claim 15, further comprising:
transmitting one or more grants for other SIBs, frame structure information, a random access message, a paging message, a transmit power control (TPC) message, or a combination thereof in the control information in the second common search space.

17. The method of claim 11, wherein the first common search space of the first type comprises a type-0 common search space, and the second common search space of the second type comprises a type-1 common search space.

18. The method of claim 11, wherein the control information in the first common search space and the second common search space is transmitted in an enhanced physical downlink control channel (ePDCCH).

19. The method of claim 11, wherein the first scrambling sequence is different from the second scrambling sequence.

20. An apparatus for wireless communication at a user equipment (UE), comprising:
a processor;
memory in electronic communication with the processor; and
instructions stored in the memory, wherein the instructions are executable by the processor to:
identify a first common search space of a first type and a second common search space of a second type to monitor for control information from a base station, wherein resources allocated for the first common search space overlap with resources allocated for the second common search space;
determine a first scrambling sequence used to scramble control information in the first common search space and a second scrambling sequence used to scramble control information in the second common search space; and
decode the control information in the first common search space based at least in part on the first scrambling sequence or the control information in the second common search space based at least in part on the second scrambling sequence.

21. The apparatus of claim 20, wherein the instructions to determine the first scrambling sequence and the second scrambling sequence are executable by the processor to cause the apparatus to:
determine the first scrambling sequence and the second scrambling sequence based at least in part on a cell identifier of the base station.

22. The apparatus of claim 20, wherein the decoding comprises blind decoding.

23. The apparatus of claim 20, wherein the instructions are further executable by the processor to cause the apparatus to:
receive, from the base station, a master information block (MIB) that identifies a resource allocation of the first common search space.

24. The apparatus of claim 23, wherein the instructions are further executable by the processor to cause the apparatus to:
identify a Multefire system information block (SIB) (SIB-MF1) grant in the control information in the first common search space;
decode a SIB-MF1 scheduled by the SIB-MF1 grant; and
determine a resource allocation of the second common search space based at least in part on the decoded SIB-MF1.

25. The apparatus of claim 20, wherein the first common search space of the first type comprises a type-0 common search space, and the second common search space of the second type comprises a type-1 common search space.

26. The apparatus of claim 20, wherein the control information in the first common search space and the second common search space is received in an enhanced physical downlink control channel (ePDCCH).

27. The apparatus of claim 20, wherein the first scrambling sequence is different from the second scrambling sequence.

28. An apparatus for wireless communication at a base station, comprising:
a processor;
memory in electronic communication with the processor; and
instructions stored in the memory, wherein the instructions are executable by the processor to:

identify control information to transmit in a first common search space of a first type and control information to transmit in a second common search space of a second type, wherein resources allocated for the first common search space overlap with resources allocated for the second common search space;

encode the control information to transmit in the first common search space using a first scrambling sequence and the control information to transmit in the second common search space using a second scrambling sequence; and transmit the control information encoded using the first scrambling sequence in the first common search space and the control information encoded using the second scrambling sequence in the second common search space.

29. The apparatus of claim 28, wherein the instructions are further executable by the processor to cause the apparatus to:

determine the first scrambling sequence and the second scrambling sequence based at least in part on a cell identifier of the base station.

30. The apparatus of claim 28, wherein the first scrambling sequence is different from the second scrambling sequence.

* * * * *